May 14, 1968  N. J. GIBBS  3,382,742
DRILLING CLAMP
Filed Oct. 11, 1965  2 Sheets-Sheet 2

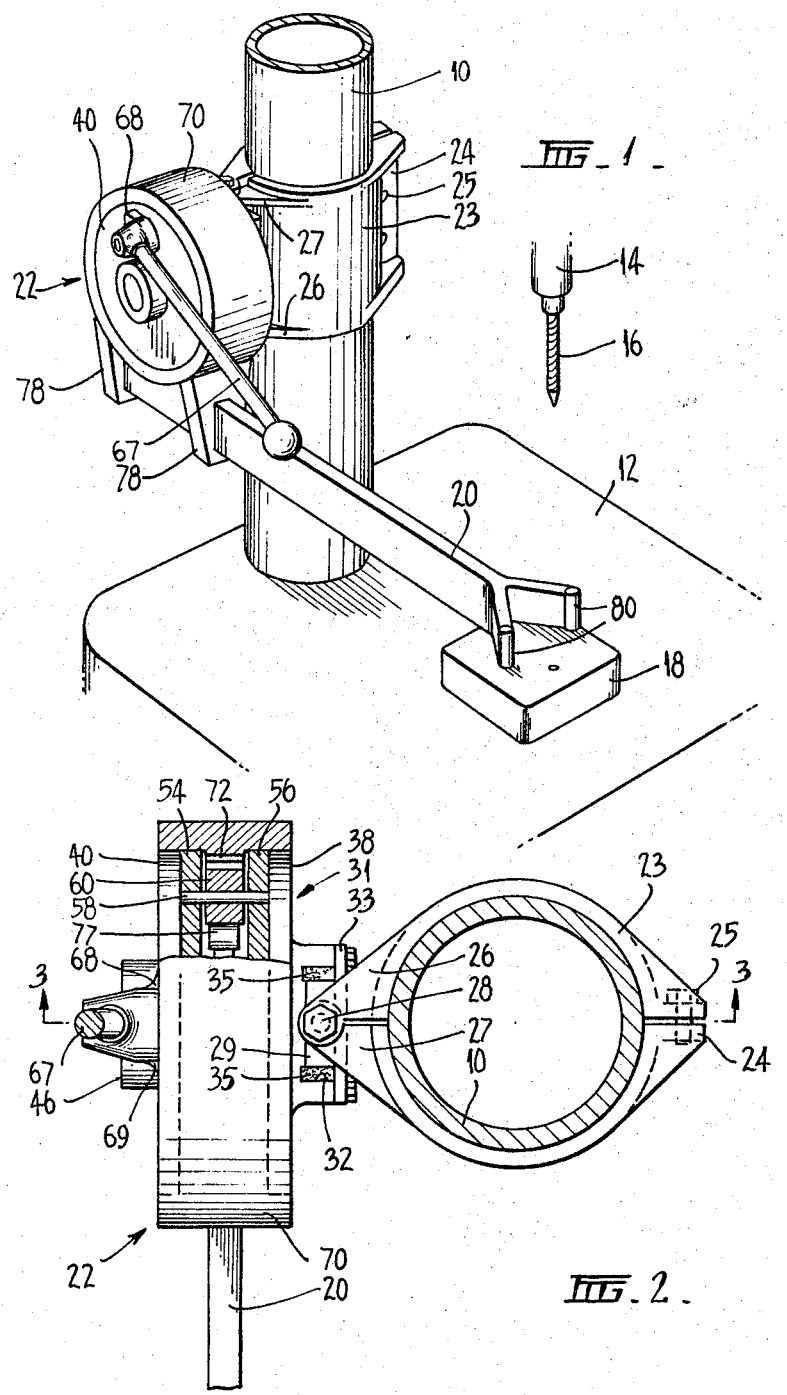

United States Patent Office 3,382,742
Patented May 14, 1968

3,382,742
DRILLING CLAMP
Neil J. Gibbs, 137 Northern Road, West Heidelberg,
Victoria, Australia
Filed Oct. 11, 1965, Ser. No. 494,592
Claims priority, application Australia, Oct. 15, 1964,
50,551
4 Claims. (Cl. 77—55)

ABSTRACT OF THE DISCLOSURE

A clamping device for clamping a workpiece to the table of a drill press comprises mounting means for engagement with the pillar of the drill press, a hollow casing rotatably supported from said mounting means and having ratchet teeth on its inner surface, a clamping arm for engagement with the workpiece, said arm being supported by the casing, a pair of discs rotatably mounted within the casing, at least one pawl pivotally supported by and between said discs and cooperating with said ratchet teeth, and means to rotate the discs in a direction to cause the pawl to rotate the casing and thereby move the clamping arm into engagement with the workpiece and clamp the workpiece to the table.

---

This invention relates to a new or improved drilling clamp, and more particularly to a clamp adapted to be used to hold work in position on the table of a drill press.

In the smaller sizes of drill presses currently available there is no provision for clamping work in position during drilling operations, so that it becomes necessary to insert the article to be drilled in a vice which is free to move on the table or to hold the work in position manually.

On the larger types of drill presses the table is usually provided with holes and/or slots adapted to receive bolts by means of which the work, or a vice holding the work, may be clamped to the table.

The use of vices and clamping bolts is inconvenient and time consuming, while holding the work manually is very dangerous, this being particularly true where the article to be drilled is of sheet metal. The main danger occurs just as the drill breaks through the sheet metal at which time there is a tendency for the sheet metal to lift and for the drill to bite into it and cause it to rotate with the drill. It has been found that if the tendency to lift can be prevented then the drill does not bite into the metal as it breaks through, and consequently a relatively light clamping force is sufficient to prevent rotation of the work with the drill.

Accordingly it is an object of this invention to provide an improved work-holding device for use in conjunction with a drill press.

It is a further object of the invention to provide such a device which is conveniently operated and which will clamp a workpiece at any location on the drill table.

The invention therefore provides a clamping device for clamping a workpiece to the table of a drill press comprising: mounting means for engagement with the pillar of the drill press; a hollow casing rotatably supported from said mounting means and having ratchet teeth on its inner surface; a clamping arm for engagement with the workpiece, supported from the casing; a pair of discs rotatably mounted within the casing; at least one pawl pivotally supported by and between said discs in a position in which it can cooperate with said ratchet teeth; and means to rotate the discs in a direction to cause the pawl to rotate the casing and thereby move said clamping arm in a direction to engage the workpiece and clamp it to the table.

Further in accordance with the invention there is provided a clamping device for clamping a workpiece to the table of a drill press comprising: mounting means for engagement with the pillar of the drill press; a horizontal shaft resiliently supported from said mounting means; a hollow casing concentric with and supported for rotation by said shaft, said casing being formed with internal ratchet teeth; a pair of discs rotatably mounted on said shaft and located one on each side of the ratchet teeth; at least one pawl pivotally supported by and between said discs; a spring arranged to urge said pawl into engagement with the ratchet teeth; a clamping arm, for engagement with the workpiece, supported by the casing; a radially arranged slot in each disc; a cam arranged in each slot, said cams being supported on a common rotatable shaft; and an operating handle fixed to said rotatable shaft whereby rotation of said handle rotates said rotatable shaft and its associated cams thus causing rotation of the discs which carry the pawl with them thereby rotating the casing to move the clamping arm in a direction to engage the workpiece and clamp it to the table.

In order that the invention may be more readily understood, it will now be described by way of example with reference to a particular embodiment illustrated in the accompanying drawings wherein:

FIGURE 1 is a perspective view of a device according to the invention clamped to the pillar of a drill press and exerting pressure on a job on the table of the drill press.

FIGURE 2 is a plan view of the device partly in section,

Figure 3:
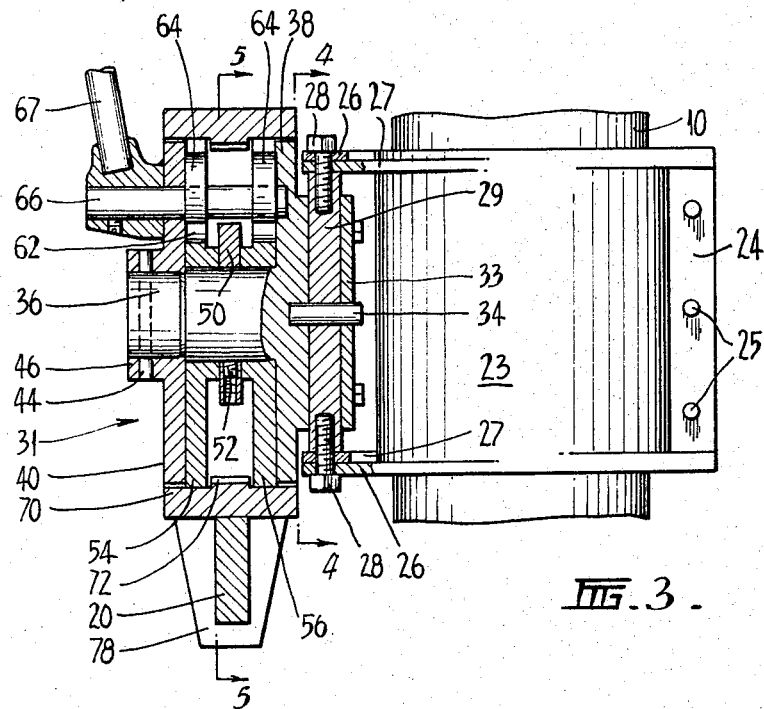
FIGURE 3 is a sectional elevational view on line 3—3 of FIGURE 2.

Referring first to FIGURE 1 there is illustrated the pillar 10 of a drill press having a table 12 mounted on it below a chuck 14 holding a drill bit 16. One the table 12 a workpiece 18 is retained in position under the drill bit 16 by means of an arm 20 of a clamping device, generally indicated at 22, of the present invention.

The clamping device 22 includes means for attachment to the pillar of the drill press in the form of a split socket 23, each half of which is provided with a projecting clamping lug 24 on one side, the lugs having complementary holes to receive clamping bolts 25. At the other side of each half of the split socket there is provided a pair of lugs 26, 27 having complementary holes adapted to receive mounting bolts 28. These latter lugs are vertically spaced and between them there is located a mounting block 29 held in mounting bracket 30 for a ratchet unit 31, the block 29 being drilled and tapped top and bottom to receive the said bolts 28.

Figures 4, 5:
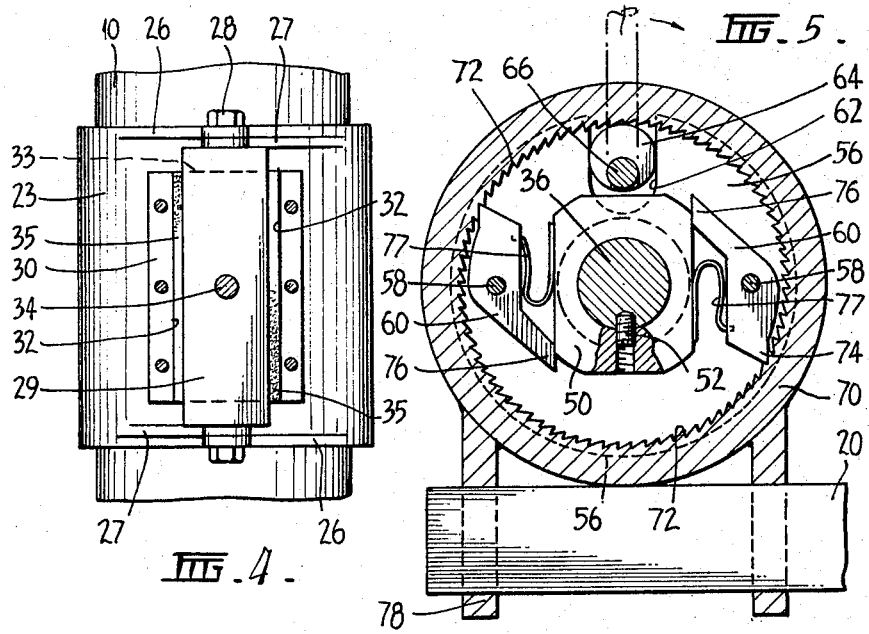
FIGURE 4 is a sectional view on line 4—4 of FIGURE 3.
FIGURE 5 is a sectional view on line 5—5 of FIGURE 3.

As can be seen in FIGURES 2, 3 and 4, block 29 is located in a channel 32 in bracket 30 by means of a plate 33 and a pivot pin 34. The pivot pin is arranged approximately centrally of block 29 and is supported at its ends in bracket 30 and plate 33. Block 29 is dimensioned to have a clearance fit between plate 33 on one side and bracket 30 on the other side so that it may rotate about pin 34, but its rotation is resisted by pads 35 of rubber or other resilient material held in channel 32, one on each side of block 29.

In an alternative construction (not shown) the holes in lugs 26, 27 receive a vertical hinge pin which passes through a bush of rubber or other resilient material in a hole bored through a mounting bracket similar to bracket 30 except that the hole referred to replaces channel 32.

The ratchet unit 31 comprises a fixed shaft 36 projecting horizontally from and in the present case formed integrally with the mounting bracket 30. A circular backing plate 38 is also integral with the bracket 30.

In an alternative construction (not shown) backing plate 38 is mounted on shaft 36 adjacent bracket 30 and is held against rotation by means such as dowel pins passing through reamed holes in the backing plate into complementary reamed holes in the bracket.

A further fixed cover plate 40 spaced from said first-mentioned cover plate is mounted on the fixed shaft 36 and is located against a shoulder 42 on the shaft by means of a pin 44 passing diametrically through the shaft and a central boss 46 on cover plate 40.

Between the two cover plates a fixed cam plate 50 is keyed to the shaft by means of a grubscrew 52. Between the fixed cam plate and each cover plate a rotatable disc 54, 56 is mounted on the shaft, these discs supporting on pins 58 extending between them at diametrically opposite positions, a pair of spring-biased pawls 60. A pair of radially extending slots 62, one in each disc, are adapted to receive respective cams 64 in the form of eccentrics mounted on or formed integrally with a rotatable shaft 66 journalled in the fixed cover plates 38, 40. An operating handle 67 is mounted on one end of the rotatable shaft, rotation of the operating handle together with the shaft and associated cams producing limited rotational movement of the discs 54, 56 relative to the fixed shaft. Handle 67 is provided with two lugs 68, 69 of which lug 68 is adapted to contact boss 46 to limit anticlockwise rotation of the handle as seen in FIGURE 1, while lug 69 is adapted to contact boss 46 to limit clockwise rotation of the handle.

An annular casing 70 surrounds the fixed cover plates and encloses the mechanism mounted between them. A set of ratchet teeth 72 of width less than the spacing between the rotatable discs 54, 56 is formed on the internal surface of the casing 70, the teeth extending into the space between said discs. The spring-biased pawls 60 are in the form of centrally pivoted levers having at one end a ratchet-engaging nose 74, and at the other end a face 76 for engagement with the fixed cam plate 50 which, as above indicated, is located between the rotatable discs which support the pawls. A pair of springs 77 urge the ratchet-engaging noses 74 towards the ratchet teeth 72.

Welded or otherwise secured to the external surface of the casing is a pair of brackets 78 adapted to receive the clamping arm 20. The clamping arm is provided at its outer end with two fingers 80 adapted to bear against the workpiece 18, one on each side of the location at which a hole is to be drilled.

The operation of the apparatus is as follows:

To adjust the height of the device on the pillar 10 of a drill press the clamping bolts 25 of the split socket 23 are released and the socket moved vertically and rotationally on the pillar 10 to a position where the end of the clamping arm 20 is vertically above the location at which the work is required to be clamped. Once set in a suitable position, the split socket should never require adjustment except where the device is to be used for clamping work of unusual size or shape.

The rotatable eccentric shaft 66 is rotated anticlockwise as seen in FIGURES 1 and 5 by means of handle 67, thereby rotating discs 54, anticlockwise and moving pawls 60 to a position wherein their faces 76 are in engagement with the high points of fixed cam plate 50 and their noses 74 are disengaged from the ratchet. This frees the casing and enables the clamping arm to be rotated to bring its fingers 80 down onto the work. The eccentric shaft is then rotated in the clockwise direction, thereby rotating the pawl-supporting discs in the same direction. This action moves the pawls over the surface of the fixed cam 50 which is shaped to permit the ratchet engaging noses 74 of the pawls to move outwardly under the influence of the springs 77 and into engagement with the ratchet.

Further rotation of the eccentric shaft after the pawls engage the ratchet causes the casing to rotate and the clamping bar to be pressed downwardly onto the work under the influence of the pawls. Reaction to the clamping force tends to turn the fixed shaft and the bracket on which it is mounted in relation to the split socket, this action being resisted by the rubber pads 35 in channel 32 on each side of block 29. Thus the mechanism applies a resilient pressure to the clamping bar.

When the drilling of a hole is completed, the operating handle 67 is rotated anticlockwise to relieve the pressure between the clamping bar and the workpiece. The workpiece can then be moved to a new location for the drilling of a second hole after reclamping. When a new workpiece is to be placed on the table of the drill press, handle 67 is preferably fully rotated anticlockwise until lug 68 contacts boss 46. In this position the faces 76 of the pawls engage the respective high points of cam plate 50 to disengage the pawls from the ratchet. This enables the clamping bar to be lifted well clear of the table to facilitate the introduction of the new workpiece.

The eccentricity of the cams on the eccentric shaft is such that rotation of the shaft through 90° provides the required degree of movement of the pawl-supporting discs and associated mechanism to cause the clamping arm to exert a predetermined pressure on the work. This feature has the advantage that the mechanism is self-locking in its clamping condition.

As modifications within the spirit and scope of the invention may readily be effected by persons skilled in the art, it is to be understood that this application is not limited to the details of the drilling clamp described by way of examples hereinabove, but is limited only by the appended claims.

I claim:

1. A clamping device for clamping a workpiece to the table of a drill press, comprising:

mounting means for engagement with the pillar of the drill press;

a hollow casing rotatably supported from said mounting means and having ratchet teeth on its inner surface;

a clamping arm, for engagement with the workpiece, supported by the casing;

a pair of discs rotatably mounted within the casing;

at least one pawl pivotally supported by and between said discs and co-operating with said ratchet teeth; and means to rotate the discs in a direction to cause the pawl to rotate the casing and thereby move the clamping arm in a direction to engage the workpiece and clamp it to the table.

2. A clamping device as defined in claim 1 wherein the casing is resiliently mounted to enable a resilient pressure to be applied to the workpiece.

3. A clamping device as defined in claim 1, which includes means to disengage the pawl from the ratchet to permit the clamping arm to be lifted from the workpiece.

4. A clamping device for clamping a workpiece to the table of a drill press, comprising:

mounting means for engagement with the pillar of the drill press;

a horizontal shaft resiliently supported from said mounting means;

a hollow casing concentric with and supported for rotation by said shaft, said casing being formed with internal ratchet teeth;

a pair of discs rotatably mounted on said shaft and located one on each side of the ratchet teeth;

at least one pawl pivotally supported by and between said discs;

a spring urging said pawl into engagement with the ratchet teeth;

a clamping arm, for engagement with the workpiece, supported by the casing;

a radially arranged slot in each disc;
a cam in each slot, said cams being supported on a common rotatable shaft; and
an operating handle fixed to said rotatable shaft whereby rotation of said handle rotates said rotatable shaft and its associated cams thus causing rotation of the discs which carry the pawl with them thereby rotating the casing to move the clamping arm in a direction to engage the workpiece and clamp it to the table.

References Cited

UNITED STATES PATENTS

| | | | |
|---|---|---|---|
| 3,052,461 | 9/1962 | Bateman | 269—224 |
| 2,554,884 | 5/1951 | Smith et al. | 269—224 |
| 2,355,386 | 8/1944 | McCullough | 269—229 |

FOREIGN PATENTS

| | | |
|---|---|---|
| 769,004 | 2/1957 | Great Britain. |
| 762,818 | 12/1956 | Great Britain. |

FRANCIS S. HUSAR, *Primary Examiner.*